United States Patent Office 3,488,500
Patented Jan. 6, 1970

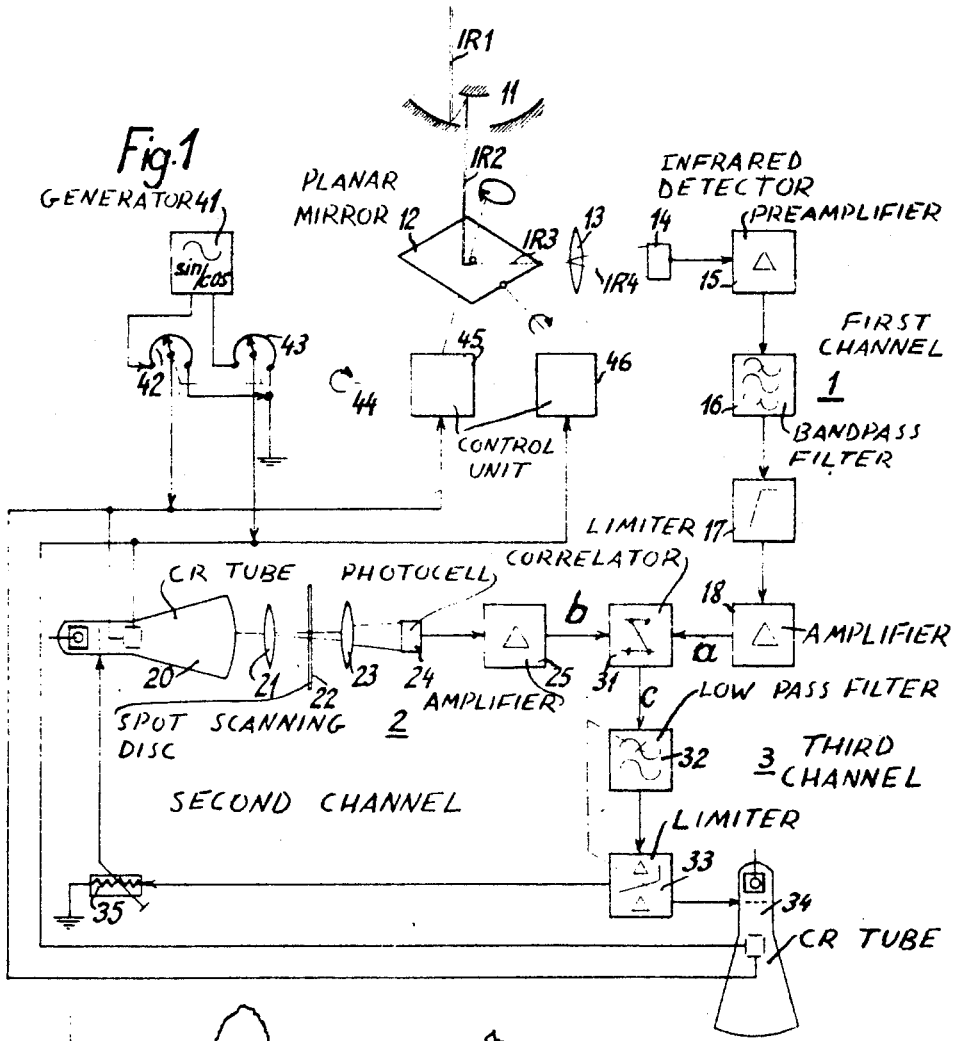
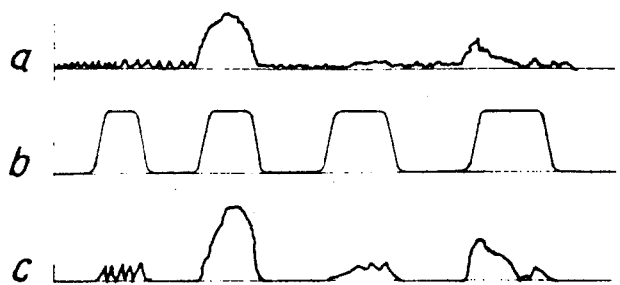

3,488,500
INFRARED DETECTION METHOD AND APPARATUS FOR CONVERTING A THERMAL CHARACTERISTIC TO A VISIBLE IMAGE
Arno Welti, Zurich, Switzerland, assignor to Albiswerk Zurich S.A., Zurich, Switzerland
Filed Feb. 17, 1967, Ser. No. 616,963
Claims priority, application Switzerland, Mar. 3, 1966, 3,051/66
Int. Cl. H01j 31/50
U.S. Cl. 250—83.3            16 Claims

ABSTRACT OF THE DISCLOSURE

Infrared detection apparatus utilizes an infrared detector and an optical scanner for spirally scanning a thermal characteristic and directing such characteristic to the infrared detector. The electron beam of a first cathode ray tube produces a spiral image on its screen in synchronism with the scanning of the thermal characteristic. A photocell produces an electrical signal corresponding to the light on the screen of the first cathode ray tube. A spot scanning disc is interposed between the first cathode ray tube and the photocell. A correlator combines the signals produced by the photocell and the infrared detector and applies the resultant combination signal to a second cathode ray tube to produce a visible image of the thermal characteristic on its screen. The resultant combination signal is also fed back to the first cathode ray tube to control the brightness of the image on its screen.

BACKGROUND OF THE INVENTION

Field of the invention

The present invention relates to an infrared detection system. More particularly, the invention relates to an infrared detection method and apparatus for converting a thermal characteristic to a visible image.

Every object or body having a temperature above absolute zero radiates heat to its surroundings. The heat is radiated in electromagnetic waves having wavelengths between 0.8 micrometer and 1.0 mm. The radiated heat rays are known as infrared rays or IR rays. The technical utilization of heat radiation for the purpose of further processing is limited, however, to a range between 0.8 and 15.0 micrometers. In accordance with the physical effect produced by the IR rays, IR short waves, known as IRK rays, which have a range between .08 and 1.2 micrometers may be distinguished from IR long waves, known as IRL rays, which have a range between 1.2 and 15 micrometers.

The IRK range is limited by the external photoeffect whereby electrons are released in a light-sensitive substance by an IR light quantum. After being accelerated in an electric field, the electrons impinge upon a luminescent screen and produce visible light quanta. The effect is utilized in most viewing devices which are operated at night. The high temperatures required for the production of such light quanta, which temperatures reach about 3,000°, present a disadvantage which requires an IR light source of radiation for observing an object.

The IRL range may be utilized by operating with the internal photoeffect, which is based, for example, on the photoconductivity of semiconductors. Such a process permits any object to be seen. To date, however, this effect has been utilized almost exclusively for the location of IR radiating objects in systems utilizing an infrared detector to which the IR radiation is applied via an optical or lens system and a scanning disc positioned in the focal plane of the optical system. The infrared detector emits an electrical signal which, after being amplified, contains processable or intelligent information. Locating an object is tantamount to establishing the angle between a fixed direction and a straight line from the object to the infrared detector. This is a polar coordinate indication in the field covered by the optical system. The scanning disc is of a configuration such that when it rotates about its axis, the radiation impinging upon the infrared detector is periodically interrupted. If the scanning disc is in the shape of a semicircle, for example, it produces pulses each having a leading edge which indicates the angle coordinate relative to a reference radial ray or beam. If the scanning disc has the configuration of a cardioid, it produces pulses each having a duration which indicates the radial coordinate of the object which is being detected relative to the axis or center of rotation of said scanning disc.

When it is desired to detect an object which has a heat radiating background or surroundings such as, for example, a house in a forest, the intensity difference between the IR radiation detected from the object and the IR radiation detected from the background is very slight. In order to overcome the foregoing difficulty, the scanning disc may be of a configuration which passes only a small portion of the overall thermal characteristic to the infrared detector. This permits differentiation between spot radiating diffraction disc from range area radiation sources. Thus, heat radiating objects or bodies may be located at distances up to 20 kilometers, under favorable conditions. The detection process will not, however, provide any information regarding the area around the detected object.

Description of the prior art

Infrared detection apparatus has been developed which provides complete information concerning an object or its surroundings, in a specific optical angle. In such apparatus, the field of view is scanned by lines and spots and is recorded synchronously with the scanning. The scanning of the field of view is accomplished with either a lens system which moves in two directions to direct the IR radiation to a single IR detector, or a lens system which moves in one direction only to direct IR radiation to a plurailty of IR detectors which resolve the other direction in accordance with image spots. Other apparatus for achieving the same results utilizes an IR detection field which is divided in a mosaic pattern comprising a considerable number of IR detectors each of which detects an image spot. The position of the image spots in the field of view is thereby determined by a scanning disc positioned in the radiation path of the optical system in a manner in which in the one direction each line corresponds to a specific scanning frequency and each image spot corresponds to a specific phase position of the signal produced by the IR detectors.

A separate channel is provided for each frequency in the synchronous recording of the signals in the visible light region. The information of each line is thus processed separately. Thermocells or thermistor bolometers are utilized to illustrate the surroundings of the object under detection. The wavelength of the heat rays within a limit of 300° K. is approximately 10 micrometers. A thermistor detects a larger temperature range than do other types of devices.

For a complete scanning of an overall thermal characteristic, each diffraction disc of the optical system must act upon the infrared detector for a period between 1 and 2 milliseconds. This limits the scanning frequency to 500 cycles per second. The adjacent image spots are not distinguishable at higher scanning frequencies. For a field of view of about 100 A‰ expansion and at a resolution to 1 A‰ for each image spot, 10,000 spots are to be scanned. In order to scan the entire field of view with thermistors, a time period of 20 seconds is required. The scanning frequency of 500 cycles per second also determines the bandwidth of the amplifier and the entire band is transmitted between 0 and 500 cycles per second. With this type of signal, sufficient redundancy for suppressing background noise is no longer attainable. Chopping the optical rays would not alleviate the situation, since the irradiation of the thermistors, resulting from the spook/gap effect, should not be for less than 1 to 2 milliseconds.

The foregoing disadvantages may be eliminated by various means. The scanning speed may be reduced to a much lower value. The redundancy is a result of the effective scanning frequency and the boundary scanning frequency, which frequencies are 500 cycles per second. If the scanning speed is reduced considerably, a movable object is no longer continually distinguishable. Thus, for example, a motor vehicle travelling at 60 kilometers per hour in a direction perpendicular to the scanning direction would be indicated only once at a scanning frequency of 500 cycles per second, since during the period in which the scanning operation has covered the field of 100 A‰ once, the vehicle has moved more than 300 A‰.

The IR detector utilized may be one which requires a shorter irradiation period. Thus, for example, an indium antimonide cell is a suitable detector. The minimum irradiation period for a cell of this type is several microseconds. A detector of this type covers a radiation range having a longitudinal wave limit of between 4.5 and 5.5 micrometers. The temperature at such wavelengths is approximately 600° K. A cell of this type must be cooled with liquid nitrogen such as, for example, at 80° K.

Scanning may be undertaken in a spiral path wherein the minimum irradiation time in the marginal regions is taken into consideration in determining the rotational speed in the spiral paths themselves. Two image spots which are adjacent to each other on a spiral line require a scanning frequency of 500 cycles per second. Two image spots which are adjacent each other on different spiral paths, however, are scanned at a considerably lower scanning frequency. Thus, at an optical angle of 160 A‰ per spiral path, the scanning period in the marginal region is approximately 1 second. The transition to the next spiral path is then at one cycle per second and the gain in noise from the ratio of the transmission bandwidth, necessary for indicating the detected information, to the scanning frequency, is 500:1. The disadvantage of the foregoing arrangement is that resolution in the marginal region is very slight. The irradiation period in the central region, however, is considerably greater for uniform scanning; that is, the period of irradiation is directly proportional to the number of spiral paths.

SUMMARY OF THE INVENTION

The principal object of the present invention is to provide a new and improved infrared detection system for converting a thermal characteristic into a visible indication. The infrared detection system or method and apparatus of the present invention increase the noise gain without reducing the region surrounding the object being detected and without any loss of resolution. The method and apparatus of the present invention avoid the disadvantages of known systems. The infrared detection system of the present invention is of simple structure and functions with efficiency, effectiveness and reliability to provide a visual indication of a detected object with accuracy, clarity and high resolution.

In accordance with the present invention, infrared detection apparatus for converting a thermal characteristic to a visible image comprises an infrared detector for providing an electrical signal corresponding to the amount of infrared radiation impinging thereon. An optical scanner spirally scans the thermal characteristic and directs the thermal characteristic to the infrared detector. A first cathode ray tube having a screen and an electron beam producer provides an electron beam which produces an image on the screen. A synchronizer coupled to the optical scanner and connected to the electron beam producer of the first cathode ray tube controls the electron beam in synchronism with the scanning of the thermal characteristic to produce an image of spiral configuration on the screen of the first cathode ray tube. A photocell spaced from the screen of the first cathode ray tube provides an electrical signal corresponding to the amount of light impinging thereon. A scanning disc positioned between the first cathode ray tube and the photocell is spaced from each and interposed in the path of light from the screen of the first cathode ray tube. A correlator having an output, an input coupled to the photocell and an input coupled to the infrared detector combines the signal provided by the photocell with the signal provided by the infrared detector. A second cathode ray tube having a screen and an electron beam producer provides an electron beam which produces an image on the screen. A feedback path couples the output of the correlator to the electron beam producer of the first cathode ray tube for controlling the brightness of the electron beam thereof. An output connection couples the output of the correlator to the electron beam producer of the second cathode ray tube for controlling the electron beam to produce a visible image of the thermal characteristic on the screen of the second cathode ray tube.

In a preferred embodiment of the present invention, the scanning disc is a spot scanning disc having a center and a center mark at its center. The correlator comprises a ring modulator and provides an output signal at its output having an amplitude dependent upon the amplitudes of the signals provided by the photocell and the infrared detector. The brightness of the electron beam of the second cathode ray tube is dependent upon the amplitude of the output signal of the correlator. The synchronizer is further connected to the electron beam producer of the cathode ray tube for controlling the electron beam in synchronism with the scanning of the thermal characteristic. The output connection and feedback path include a common variable low pass filter having a limit frequency varying element and a common variable amplitude limiter having a limit amplitude varying element mechanically coupled to and movable with the limit frequency varying element of the variable low pass filter. The synchronizer is further coupled to and movable with the limit frequency varying element of the variable low pass filter.

In accordance with the method of the present invention, a thermal characteristic is converted to a visible image by converting the thermal characteristic to a plurality of discrete image spots. A first electrical current is produced which corresponds to the thermal intensity of each of the image spots and has a corresponding frequency and phase position for each of the image spots. A light spot is moved over a field corresponding to the thermal characteristic. A second electrical current is produced from the light spot and corresponds in frequency and phase position to the position of the light spot in the field. The first and second electrical currents are combined to produce a resultant electrical current. Another light spot is moved synchronously with the light spot providing a visible image of the thermal characteristic. The brightness of the first mentioned light spot is controlled in accordance with the resultant electrical current.

BRIEF DESCRIPTION OF THE DRAWING

In order that the present invention may be readily carried into effect, it will now be described with reference to the accompanying drawings, wherein:

FIG. 1 is a block diagram of an embodiment of the infrared detecting apparatus of the present invention;

FIG. 2 is a graphical presentation of various waveforms appearing in the embodiment of FIG. 1;

DESCRIPTION OF THE PREFERRED EMBODIMENT

Figure 3:
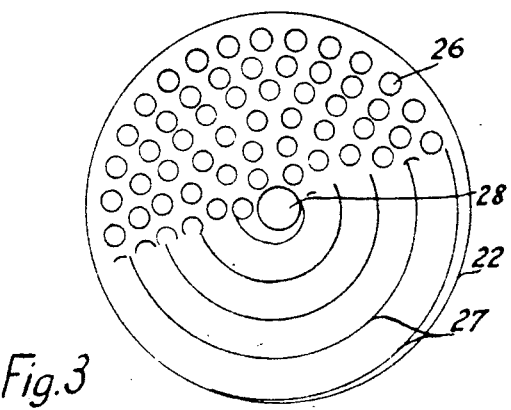
FIG. 3 is a spot scanning disc which may be utilized as the spot scanning disc 22 of the embodiment of FIG. 1.

In FIG. 1, the infrared detection apparatus of the present invention for converting a thermal characteristic to a visible image comprises a first channel 1, a second channel 2 and a third or processing channel 3. The first channel 1 is an optical or lens system such as, for example, a Cassegrain optical system. The Cassegrain system detects an image field which radiates infrared rays IR1 which are radiated from a single image spot. The infrared rays IR1 are reflected by a reflector 11, and the reflected infrared rays IR2 are directed to a planar mirror 12 which is movably mounted for positioning in at least two directions. The infrared rays IR3 deflected by the mirror 12 are made divergent and are directed to an infrared detector 14 by a collecting optical lens 13. The divergent infrared rays IR4 impinge upon the infrared detector 14 which produces an output electrical current which corresponds to the impinging infrared rays.

The current produced by the infrared detector 14 is initially amplified in a preamplifier 15 and is then passed through a bandpass filter 16 and a limiter 17 to an amplifier 18. The current signals, proportional to the detected infrared radiation, are thus amplified initially by the preamplifier 15. The bandpass filter 16 is tuned to a cutoff frequency equal to the signal frequencies of the infrared detector 14 and passes a band within such frequency limits. The filtered signals are then limited in amplitude by the limiter 17 and amplified by the amplifier 18. The filtered, limited and amplified current signals $a$ are thus supplied from the output of the amplifier 18 to an input of a correlator 31. Curve $a$ of FIG. 2 illustrates the signal $a$ fed by the first channel 1 to the correlator 31. The first channel 1 thus comprises the components 11 to 18.

The second channel 2 comprises a first cathode ray tube or CR tube 20. The first CR tube 20 provides a plurality of electron rays or beams which produce a visible image of spiral configuration on its screen. The image on the screen of the first CR tube 20 is directed via a lens 21, a spot scanning disc 22 and a lens 23 to a photocell 24. Thus, each image spot of the image on the screen of the first CR tube 20 impinges upon the photocell 24. The photocell 24 produces an electrical current corresponding to the light impinging thereon. The current produced by the photocell 24 is amplified by an amplifier 25. The amplifier 25 provides an output signal $b$ which is applied to the other input of the correlator 31. The second channel 2 comprises the components 20 to 25. The output signal $b$ of the amplifier 25 is illustrated in curve $b$ of FIG. 2.

The image on the screen of the first CR tube 20 is of spiral configuration and is directed as such to the spot scanning disc 22. A suitable spot scanning disc 22 is shown in FIG. 3. The spot scanning disc of FIG. 3 is opaque, with the exception of a plurality of translucent or transparent image spots 26 which are shown on only half of said disc in order to permit the illustration of the spiral scanning line 27 on the other half of said disc. Since uniform distribution is not possible, an inconstency 28 appears at the center of the spot scanning disc 22. A marking cross may be placed at the center of the central area 28 of the spot scanning disc 22.

Light rays passed by the spot scanning disc 22 of FIG. 1 are made divergent by the lens 23 and are directed by said lens to the light-sensitive surface of th photocell 24. In actuality, each of the lenses 21 and 23 may comprise a lens system or a plurality of lenses for achieving the objective set forth. Each image spot 26 (FIG. 3) of the spot scanning disc 22 functions as a diffraction disc and permits the illumination of the entire photosensitive surface of the photocell 24. The output current of the photocell 24 is a DC having a continual frequency decrease as the radius of the spiral image on the screen of the first CR tube 20 decreases.

The correlator 31 is included in the third channel 3 and combines the signals $a$ and $b$ supplied to it by the amplifiers 18 and 25, respectively. The combined signals $a$ and $b$ are provided by the correlator 31 as an output signal $c$, shown as curve $c$ of FIG. 2. The output signal $c$ of the correlator 31 is supplied to a control grid of a second cathode ray tube or CR tube 34 via a low pass filter 32 and a limiter 33. The low pass filter 32 has a limit frequency varying element and the limiter 33 has a limit amplitude varying element mechanically coupled to or ganged with the limit frequency varying element of the low pass filter 32 and movable therewith for joint control. The limiter 33 provides an output signal to a control grid of the first CR tube 20 via a potentiometer 35. Thus, each of the first and second CR tubes 20 and 34 is controlled by the output of the limiter 33. The third channel 3 comprises the components 31 to 34.

The signals $a$ and $b$ from the amplifiers 18 and 25, respectively, are combined by the correlator 31 in a suitable manner to provide an output signal $c$. The correlator 31 may comprise a ring modulator, for example, so that the combination of the input signals $a$ and $b$ is by multiplication. Since the adjusting element of the low pass filter 32 and the adjusting element of the limiter 33 are mechanically coupled to each other in a ganged connection, the adjustment of the pass frequency of said filter and of the limiting amplitude of said limiter is simultaneous and in synchronism.

As shown in the curve $c$ of FIG. 2, the output signal $c$ of the correlator 31 occurs only when there is amplitude coincidence between the input signals $a$ and $b$ to said correlator. The duration of the output signal $c$ depends upon the frequency of each of the input signals $a$ and $b$ so that said output signal $c$ is a low frequency pulse. The width or duration of the output pulse $c$ is controlled by the low pass filter 32, so that in a borderline case, only pulses of the innermost spiral path will appear in said output signal and, in the opposite borderline case, all the pulses from the entire field of view will appear in said output signal. The limiter 33 functions to limit the amplitude of the output signal $c$, since such amplitude may be very high, because said output signal is a result of the multiplication of the amplitudes of the input signals $a$ and $b$, and since too high an amplitude would not be suitable for application to the first CR tube 20.

The deflection plates or electron beam control means of each of the first and second CR tubes 20 and 34 are connected in parallel and the voltages produced by a sine and cosine wave generator 41 are applied to the parallel connection to synchronously deflect the electron beams of said CR tubes. The output voltages of the generator 41 are converted into two alternating voltages which are displaced 90° in phase from each other. The 90° phase displaced alternating voltages are converted to electron beam deflection control voltages by two potentiometers 42 and 43, which shape them into sawtooth waves. Since the electron beam deflection control voltages are sawtooth waves, the images provided on the screens of the first and second CR tubes 20 and 34 are spirals.

The sawtooth voltages provided by the sine wave generator 41 and the potentiometers 42 and 43 are also applied to control units 45 and 46. The control unit 45 is mechanically coupled to the planar mirror 12 and moves said mirror about a predetermined axis. The control unit 46 is mechanically coupled to the planar mirror 12 and moves said mirror about a different predetermined axis. The scanning operation provided by the Cassegrain optical system is thus in synchronism with the deflection of the electron beams of the first and second CR tubes 20 and 34 and follows a sawtooth pattern. The sawtooth movement of the planar mirror 12 of the Cassegrain optical system produces a spiral scanning pattern for the overall thermal characteristic. The spiral scanning pattern for the overall thermal characteristic is isochronic to the spiral images produced on the screens of the first and second CR tubes 20 and 34. The control units 45 and 46 are mechanically coupled to the mechanical coupling between the low pass filter 32 and the limiter 33 (not shown in FIG. 1). Variation of the low pass filter 32 is thus in synchronism with the deflection of the electron beams of the first and second CR tubes 20 and 34 and the scanning pattern of the Cassegrain optical system.

Due to the spiral scanning pattern provided by the Cassegrain optical system, diffraction discs appear on the heat-sensitive surface of the infrared detector 14. The overall thermal characteristic provided by the Cassegrain optical system is completely covered by the diffraction discs during a complete cycle of the spiral. The diffraction discs remain on the heat-sensitive surface of the infrared detector 14 for a period determined by the tangential speed of the spiral movement. Thus, in the marginal region, the scanning of the thermal characteristic is more rapid than the scanning of the thermal characteristic at the center of the spiral. The resultant signal frequency must be adjusted in the margin region to the scanning frequency of the infrared detector 14.

After each cycle, or complete rotation, of the spiral scanning pattern, a diffraction disc remains on the heat-sensitive surface of the infrared detector 14 for a period of time which is inversely proportion to the radius of the spiral. The diffraction disc produces a frequency modulated signal of which the modulated frequency corresponds to the distance of the diffraction disc from the center of the spiral. Additional information may be provided by marking a predetermined radius on the heat-sensitive surface of the infrared detector 14. The phase difference between the current produced by the infrared detector 14 and the time that the marked radius line is scanned, is then noted. The signal current produced by the infrared detector 14 is thus of sufficient amplitude to provide the necessary redundance.

In an operating embodiment of the apparatus of the present invention, the infrared detector 14 comprises a thermistor having an active wavelength of about 10 micrometers; that is, in a temperature range of about 300° K. The angle of view of 160 A‰ and the heat-sensitive surface of the thermistor is covered exactly by the diffraction disc produced by a radiating spot of 1 A‰ expansion. The entire field of view thus contains 20,000 image components or elements. In order that a current be produced by the thermistor, the diffraction disc must remain on the heat-sensitive surface of said thermistor for a period of from 1 to 2 milliseconds.

The scope of the field of view of 160 A‰ amounts to approximately 500 image components, so that the outermost spiral scanning path is covered in one second. The field of vision is thus covered by 80 spiral scanning paths. The innermost spiral scanning path thus has 10 image components. If scanning is uniform, an angle scanning cycle is completed in one second. The sequence frequency of the scanned image is thus 500 cycles per second in the outermost spiral scanning path and 10 cycles per second in the innermost spiral scanning path. An image element remains in the innermost spiral scanning path for 100 seconds. The amplifier band width is between 10 and 500 cycles per second.

In the second channel 2, the spot scanning disc 22 forms diffraction discs which correspond to the diffraction discs formed in the Cassegrain optical system which appear on the infrared detector 14. The intensity of the image provided on the screen of the first CR tube 20 is selected in a manner whereby the noise produced in the photocell 24 may be suppressed so that the ensuing signal is essentially noise-free. In an operating embodiment of the apparatus of the present invention, the spot scanning disc 22 cannot be divided into 20,000 image spots, as may the thermal characteristic, since the remaining image would be inadequate. There are thus holes or gaps of equal size between the image spots. Thus, 10,000 diffraction discs are produced by the spot scanning disc 22.

The output signal $c$ of the correlator 31 is a DC pulse train. The duration or width of each of the pulses $c$ corresponds to the period of time during which a diffraction discs remains on the heat-sensitive surface of the infrared detector or thermistor 14 or on the photocell 24. The pulse duration is therefore equal to the frequency modulation of the signals. Useful frequencies between 10 and 500 cycles per second are therefore supplied by the correlator 31 to the low pass filter 32. If the entire bandwidth of 500 cycles per second is utilized, the resulting noise gain is provided by the correlator 31. If, however, the limiting frequency of the low pass filter 32 is adjusted, any desired noise gain may be provided. Thus, for example, the limit frequency of the low pass filter 32 may be adjusted to the lowest existing frequency of 10 cycles per second. This provides a signal to noise ratio of 500, which is 10 times 50, for the innermost spiral path.

The signals of the image spots in the innermost spiral scanning path are transmitted unchanged, while in the outermost spiral scanning path only those signals having a distance corresponding to 10 cycles per second are transmitted; that is, each fiftieth image spot is transmitted. The geometrical resolution remains the same while the intelligence resolution decreases. An object in the margin of the image is indicated, therefore, but its contour is blurred, however. An object moving from the margin of the image toward the center of the image at a speed of 1 A‰ per second is clearly indicated during the course of its movement, since its repetition frequency is 1 cycle per second. The contour of the object is clearly and sharply illustrated in the central area of the image.

If it is desired that the object be clearly indicated in the marginal region, the limit frequency of the low pass filter 32 may be increased to 500 cycles per second. Although such an increase in limit frequency subjects the image to more noise, it provides a uniformly clear indication of the image throughout the entire field of view. The low pass filter 32 may be varied in limit frequency in octave steps so that the variation or graduation of the sharpness of the indication is satisfactory. The same effect is provided if the scanning speed is increased ten times by the utilization of a low pass filter having a limit frequency of 10 cycles per second. This results in the redundance of the center of the image being just small enough to obviate an additional noise gain. The image field is then scanned once every 8 seconds instead of every 80 seconds. It is also feasible to synchronize the adjustment of the limit frequency of the low pass filter 32 with the spiral scanning operation, as heretofore indicated. This results in a sharper indication of the object throughout the entire image field. The freedom from noise of the object increases, however, as it approaches the center of the image.

Figure 4:
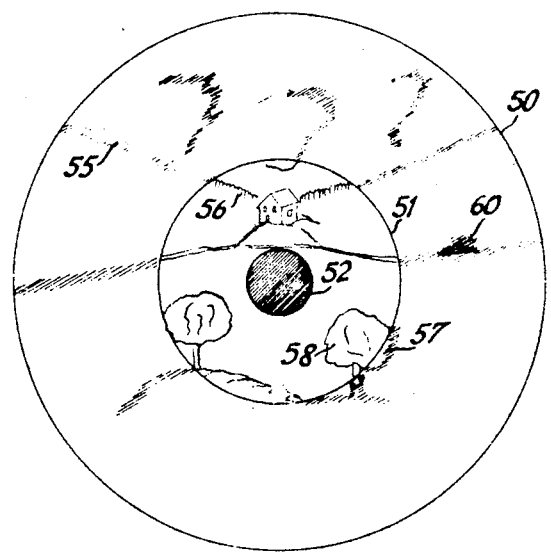
FIG. 4 is a visible image of an object and its surroundings detected by the apparatus of the present invention.

An overall thermal characteristic produced on the screen of the second CR tube 34 is illustrated in FIG. 4. The outer circle 50 encloses the region in which an indication of the object is obtained, due to adjustment of the limit frequency of the low pass filter 32. The inner circle 52 encloses the center of the image and corresponds to the center of the spot scanning disc 22. There is no image indication in the central area defined by the circle 52. The complete image field, defined by the outer circle 50, indicates a landscape area comprising hills, clouds and trees in the foreground.

The contours of objects indicated in the area between an intermediate circle 51 and the outer circle 50 are blurred, whereas the contours of objects indicated within the intermediate circle 51 are sharp. This is especially illustrated by the back of the hill and the tree in the right foreground. The forest 55 indicated in the area between the outer circle 50 and the intermediate circle 51 is blurred, and the forest 56 indicated within the intermediate circle 51 is sharp. The portion 57 of the tree in the right foreground is blurred while its portion 58 within the intermediate circle 51 is sharply defined. A motor vehicle 60 moving on a course toward the image center 52 is not sharply defined in the area between the circles 50 and 51. As the motor vehicle moves toward the center of the image within the intermediate circle 51, however, it will be shown in sharp definition.

While the invention has been described by means of specfic examples and in a specific embodiment, I do not wish to be limited thereto, for obvious modifications will occur to those skilled in the art without departing from the spirit and scope of the invention.

I claim:
1. Infrared detection apparatus for converting a thermal characteiistic to a visible image comprising:
   infrared detector means for providing an electrical signal corresponding to the amount of infiared radiation impinging thereon;
   optical scanning means for spirally scanning said thermal characteristic and directing said thermal characteristic to said infrared detector means;
   a first cathode ray tube having a screen and electron beam producing means for providing an electron beam which produces an image on said screen;
   synchronizing means coupled to said optical scanning means and connected to the electron beam producing means of said first cathode ray tube for controlling said electron beam in synchronism with the scanning of said thermal characteristic to prcduce an image of spiral configuration on the screen of said first cathode ray tube;
   a photocell spaced from the screen of said first cathode ray tube for providing an electrical signal corresponding to the amount of light impinging thereon;
   a scanning disc positioned between said first cathode ray tube and said photocell, spaced from each and interposed in the path of light from the screen of said first cathode ray tube;
   correlator means having an output, an input coupled to said photocell and an input coupled to said infrared detector means for combining the signal provided by said photocell with the signal provided by said infrared detector;
   a second cathode ray tube having a screen and electron beam producing means for providing an electron beam which produces an image on said screen;
   feedback means coupling the output of said correlator means to the electron beam producing means of said first cathode ray tube for controlling the brightness of the electron beam thereof; and
   output means coupling the output of said correlator means to the electron beam producing means of said second cathode ray tube for controlling said electron beam to produce a visible image of said thermal characteristic on the screen of said second cathode ray tube.

2. Infrared detection apparatus as claimed in claim 1, wherein said scanning disc is a spot scanning disc.

3. Infrared detection apparatus as claimed in claim 1, wherein said scanning disc is a spot scanning disc having a center and a center mark at its center.

4. Infrared detection apparatus as claimed in claim 1, wherein said correlator means comprises a modulator.

5. Infrared detection apparatus as claimed in claim 1, wherein said correlator means comprises a ring modulator.

6. Infrared detection apparatus as claimed in c'aim 1, wherein said correlator means provides an output signal at its output, said output signal having an amplitude dependent upon the amplitudes of the signals provided by said photocell and said infrared detector and the brightness of the electron beam of said second cathode ray tube being dependent upon the amplitude of the output signal of said correlator means.

7. Infrared detection apparatus as claimed in claim 1, wherein said synchronizing means is further connected to the electron beam producing means of said second cathode ray tube for controlling said electron beam in synchronism with the scanning of said thermal characteristic.

8. Infrared detection apparatus as claimed in claim 1, wherein said output means comprises low pass filter means connected to the output of said correlator means and limiter means connected between said low pass filter means and said second cathode ray tube.

9. Infrared detection apparatus as claimed in claim 8, wherein said feedback means includes said low pass filter means, said limiter means and a potentiometer connected between said limiter means and said first cathode ray tube.

10. Infrared detection apparatus as claimed in claim 9, wherein said low pass filter means comprises a variable low pass filter and said limiter means comprises a variable amplitude limiter.

11. Infrared detection apparatus as claimed in claim 9, wherein said low pass filter means comprises a variable low pass filter having a limit frequency varying element and said limiter means comprises a variable amplitude limiter having a limit amplitude varying element mechanically coupled to and movable with the limit frequency varying element of said variable low pass filter.

12. Infrared detection apparatus as claimed in claim 9, wherein said low pass filter means comprises a variable low pass filter having a limit frequency varying element movable in stepwise manner in octave steps.

13. Infrared detectiion apparatus as claimed in claim 11, wherein said synchronizing means is further coupled to and movable with the limit frequency varying element of said variable low pass filter.

14. A method for converting a thermal characteristic to a visible image, comprising the steps of
   converting said thermal characteristic to a plurality of discrete image spots;
   producing a first electrical current corresponding to the thermal intensity of each of said image spots and having a corresponding frequency and phase position for each of said image spots;
   moving a light spot over a field corresponding to said thermal characteristic;
   producing from said light spot a second electrical current corresponding in frequency and phase position to the position of said light spot in said field;
   combining said first and second electrical currents to produce a resultant electrical current;
   moving another light spot synchronously with said light spot to provide a visible image of said thermal characteristic; and
   controlling the brightness of said first-mentioned light spot in accordance with said resultant electrical current.

15. A method for converting a thermal characteristic to a visible image as claimed in claim 14, comprising scanning said thermal characteristic in a spiral pattern to convert said thermal characteristic to a plurality of discrete image spots.

16. A method for converting a thermal characteristic to a visible image as claimed in claim 15, comprising scanning said thermal characteristic in synchronism with the movement of said first-mentioned light spot.

References Cited

UNITED STATES PATENTS 3,372,230  3/1968  Wurz.
3,372,228  3/1968  Aemmer.

RALPH G. NILSON, Primary Examiner

M. J. FROME, Assistant Examiner

U.S. Cl. X.R.
250—202, 203, 236